Nov. 10, 1936.
F. M. KAUFMAN
2,060,502
METHOD OF WEAVING PILE FABRICS
Filed April 12, 1933
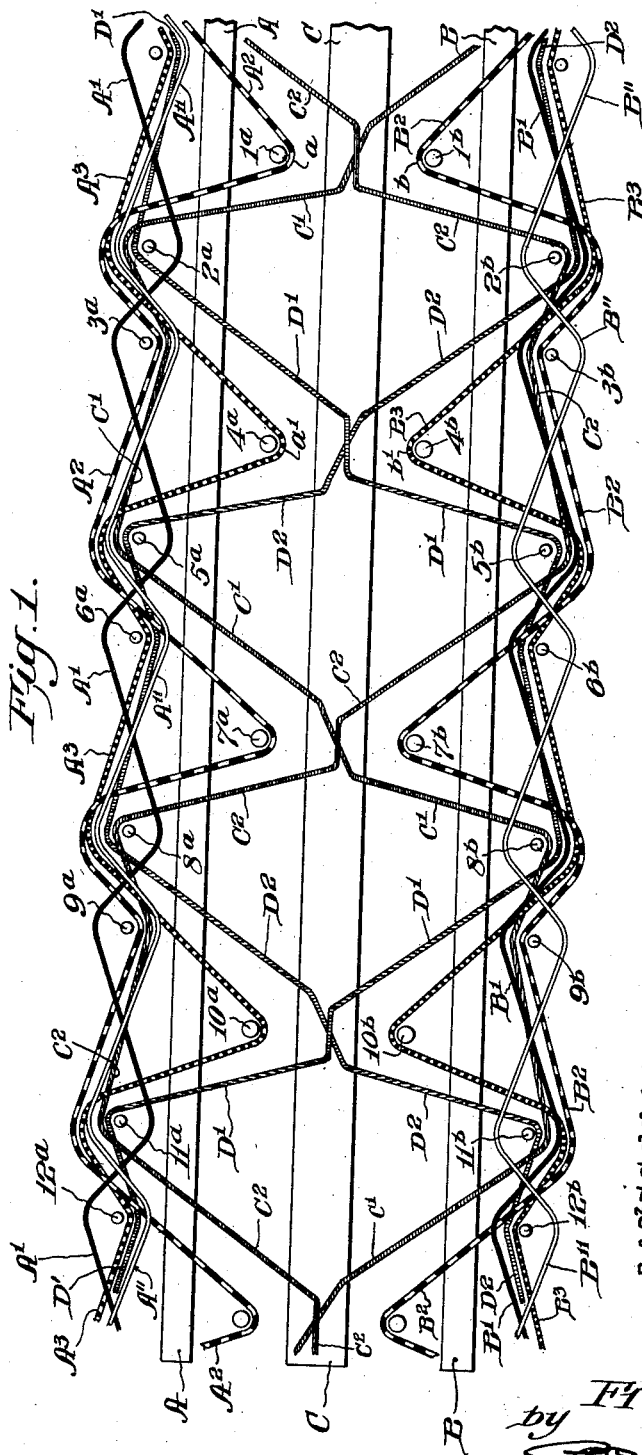
Inventor
Frank M. Kaufman
by
Attorney.

Patented Nov. 10, 1936

2,060,502

UNITED STATES PATENT OFFICE 2,060,502

METHOD OF WEAVING PILE FABRICS

Frank M. Kaufman, Merion, Pa., assignor to Collins & Aikman Corporation, Philadelphia, Pa., a corporation of Delaware Application April 12, 1933, Serial No. 665,724

1 Claim. (Cl. 139—398)

My invention is a pile fabric having a ground or back having interlaced therewith uncut pile loops and warps forming cut pile, and the method of weaving such fabrics.

In fabric embodying my invention, the ground or back is composed of ground warps and ground wefts and the face is formed of pile warps some of which form uncut face loops, which are supported during weaving, and may be supported in use, by face wefts, and other of the pile warps are interlaced with the ground wefts and cut so as to form cut pile having the form of a W or so-called fast pile weave.

Such fabrics are woven double, in accordance with my invention, upon a loom having sets of pile loop gauges, such as wires or cords extending warpwise of the loom, one set of gauges regulating and aiding in the formation of the uncut loops of the top fabric and another set of gauges regulating and aiding in the formation of the set of uncut loops of the bottom fabric. The top and bottom fabrics are connected by pile warps extending from one to the other of the fabrics, and the length of the pile warp sections between the two grounds, and the consequent length of the cut pile tufts, may be regulated by mechanically delivering a pre-determined length of such pile warps for each beat of the loom, or the length of the cut pile tufts may be regulated by the use of a set of gauges disposed in a substantially horizontal plane between the other two sets of gauges. The latter sets of gauges are shedded by the loom shedding mechanism in weaving, and a double shuttle loom is preferably utilized in weaving the fabrics double so as to lay a pair of wefts simultaneously, but a single shuttle loom may be employed. The pile warps which cross from one ground to the other may be cut either on the loom or subsequently to form the cut pile.

In the weaving of my novel fabrics on the double plush principle, a single set of ground warps or backing yarns may be used for each fabric or oppositely acting ground warps may be used as indicated in the drawing. The ground warps of each fabric are woven over the wefts thereof oppositely to two sets of pile warps which form uncut loops on the face of the fabric as well as oppositely to two sets of pile warps which pass from one fabric to the other fabric to form cut pile tufts on both of them. After every second ground pick in each fabric, a face pick is laid to support a row of uncut face pile loops.

The characteristic features and advantages of my method and the product thereof will further appear from the following description and the accompanying drawing in illustration thereof.

In the drawing, Fig. 1 is a longitudinal sectional view illustrating diagrammatically the arrangement of yarns and a preferred arrangement of gauges in the weaving of a double fabric in accordance with my invention, and Fig. 2 is a graph illustrating diagrammatically the shedding of warps and top and bottom gauges during the picking of the wefts of a repeat.

As shown in the drawing, a double fabric is woven on a double shuttle loom having a set of upper gauge wires A supported at their left hand ends (Fig. 1) by the shedding mechanism of the loom, and a set of lower gauge wires B supported at their left hand end (Fig. 1) by the shedding mechanism of the loom. A set of stationary gauge wires C may be provided to regulate the distance between the fabrics during weaving and consequently the length of the cut pile.

By the utilization of such mechanism and of my improved method, there may be produced a top fabric and a bottom fabric each having a ground and short loops of uncut pile and longer tufts of cut pile. Such fabrics as they are woven are drawn off the free ends of the gauges A, B and C towards the right (Fig. 1) and are cut apart by severing the pile warps passing from one fabric to the other.

The weaving of the fabric involves the shedding of gauges A and of ground warps A' and A", loop-pile warps $A^2$, and loop pile warps $A^3$ for the top fabric; the shedding of gauges B, ground warps B' and B", loop pile warps $B^2$, and loop pile warps $B^3$ for the bottom fabric; and the shedding of the pile warps $C^1$ and $C^2$ and $D^1$ and $D^2$ for both fabrics. The shuttle or shuttles are so picked and the warps so shedded as to lay a face weft in each fabric and then lay a pair of ground wefts in each fabric, and a repeat includes the laying of twelve pairs of wefts.

At the beginning of the weaving of the fabric fragment shown in Fig. 1 (starting at the right of the figure), the shedding mechanisms elevate the warps A', A", $B^2$, $A^3$, $D^1$ and gauges A, depresses the warps B', B", $B^3$, $A^2$, $D^2$ and gauge B, and holds in intermediate position the warps C' and C". This permits the simultaneous or sequential laying of the picks $1a$ and $1b$ which are supported respectively against the gauges A and B and support respectively the warps $A^3$ and $B^2$ when the latter are bent to form uncut loops $a$ on the top fabric and similar loops $b$ on the bottom fabric.

During the beat-up of the picks $1a$ and $1b$ the shedding mechanism elevates the warps $A^2$, $C'$, $B''$ and gauges B depresses the warps $A'$, $A^3$, $C^2$ and gauges A and leaves the remaining warps in their former position. The pick $2a$ may then be laid so that the ground warp $A'$ thereon opposes ground warp $A''$ and the pile warps $A^2$ $A^3$, $C^1$, and $D^1$. The pick $2b$ is simultaneously or sequentially laid and the ground warps $B'$ oppose ground warp $B''$ and the pile warps $B^2$, $B^3$, $C^2$ and $D^2$ looped thereunder.

The next movement of the shedding mechanism elevates the ground warps $A'$ and $B''$, loop warps $A^3$ and $B^3$; depresses the loop warps $A^2$ and $B^2$ and ground warps $B'$ and $A''$; moves to intermediate position the cut pile warps $C^1$, $C^2$, $D^1$, $D^2$ and leaves the gauges A and B unchanged. The pick $3a$ is then laid so that the ground warp $A'$ opposes the ground warps $A''$ and the pile warps $A^2$ and $C^1$. The pick $3b$ is simultaneously or sequentially laid and the ground warp $B'$ opposes the ground warp $B''$ and the pile warps $B^2$ and $C^2$.

The shedding mechanism is again operated to elevate the ground warps $A''$, the loop warps $A^2$, the cut pile warps $C^1$, the gauges A; to depress the backing warps $B''$, the loop warps $A^3$, the cut pile warps $C^2$ and the gauges B; the position of the remaining warps being unchanged. The weft $4a$ when laid is supported against the gauges A and supports the loop warps $A^3$ when these are bent to form the uncut loops $a'$. The weft $4b$ is supported against the gauges B and supports the bending of the uncut loop $b'$ formed by the warps $B^3$.

The shedding mechanism next lifts the ground warps $B^1$, the loop warps $B^2$, the cut pile warps $D^2$ and the gauges B; depresses the backing warps $A'$, the loop warps $B^3$, the cut pile warps $D^1$ and gauges A, the remaining warps being left as before. The pick or weft $5a$ is then laid between the ground warps $A'$ and the ground warps $A''$ and the pile warps $A^2$, $A^3$, $C^1$ and $D^2$. Simultaneously or sequentially the pick or weft $5b$ is laid between the ground warps $B'$ and the ground warps $B''$ and the pile warps $B^2$, $B^3$, $C^2$ and $D^1$. The engagement of the warps $D^2$ by the pick $5a$ and the engagement of the warps $D^1$ by the pick $5b$ causes the pile warps $D^1$ and $D^2$ to cross one another between the fabrics and adjacent to the loops $a'$ and $b'$.

The next movement of the shedding mechanism elevates the backing warps $A'$, $B''$, the loop warps $A^3$; depresses the backing warps $B'$ and $A''$, and the loop warps $A^2$, $B^2$; moves the cut pile warps $C^1$, $C^2$, $D^1$, $D^2$ to intermediate position; the gauges A and B being left unchanged from their previous positions. The weft $6a$ is then laid in the ground between the ground warps $A'$ and the warps $A''$, $A^3$ and $D^2$. The weft or pick $6b$ is simultaneously or sequentially laid in the ground of the bottom fabric between the ground warps $B'$ and the warps $B''$, $B^3$ and $D^1$.

This completes half of a cycle, the remainder of which is identical with that described as far as the backing warps and loop pile warps are concerned, but in the second half of the cycle the pile warps $C^1$ and $D^1$ form W-pile in the bottom fabric instead of in the top fabric as in the first half of the cycle, and the pile warps $C^2$ and $D^2$ form W-pile in the top fabric in the second half of the cycle instead of in the bottom fabric as in the first half cycle. The shedding necessary for this will be apparent from Fig. 2 in which the dots indicate that the warp threads or gauges represented thereby are elevated; the crosses indicate that the warp threads represented thereby are in an intermediate position; and the blanks indicate that the warp threads or gauges represented thereby are in a depressed position.

Having described my invention, I claim:

In the method of weaving double fabrics with a set of pile loops gauges for controlling the length of loops on each fabric, the steps which consist in laying a weft above the upper set of gauges and laying a weft below the lower set of gauges, interlacing with the first weft ground warps and a plurality of pile warps; interlacing with the second weft ground warps and a plurality of pile warps; laying a further weft above the upper set of gauges, laying a further weft below the lower set of gauges, interlacing with the third named weft the first named ground warps and a portion only of the first named pile warps; interlacing with the fourth named weft the second named ground warps and a portion only of the second named pile warps; laying a further weft below the upper set of gauges, laying a further weft above the lower set of gauges; interlacing with the fifth named weft warps interlaced with the first named weft which were not interlaced with the third named weft; interlacing with the sixth named weft pile warps interlaced with the second named weft which were not interlaced with the fourth named weft; laying a further weft above the upper set of gauges, laying a further weft below the lower set of gauges; interlacing with the seventh named weft the pile warps interlaced with the fifth named weft and pile warps interlaced with the second named weft; and interlacing with the eighth named weft pile warps interlaced with the sixth named weft and pile warps interlaced with the first named weft.

FRANK M. KAUFMAN.